Dec. 25, 1962 A. HUET 3,070,531
CONTROL APPARATUS FOR NUCLEAR REACTOR
Filed Jan. 29, 1958 3 Sheets-Sheet 1

INVENTOR:
ANDRE HUET

BY James J. Whelan
ATTORNEY

Dec. 25, 1962   A. HUET   3,070,531
CONTROL APPARATUS FOR NUCLEAR REACTOR
Filed Jan. 29, 1958   3 Sheets-Sheet 3
FIG. 8
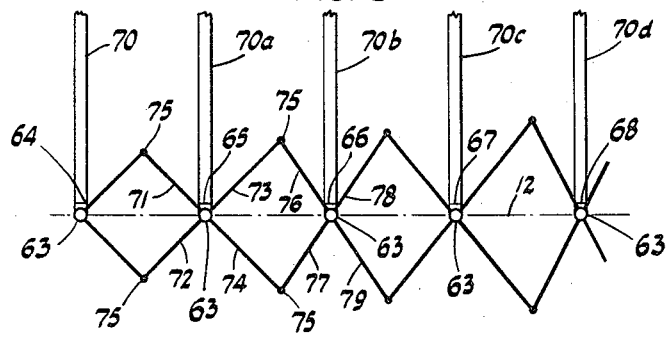
FIG. 9
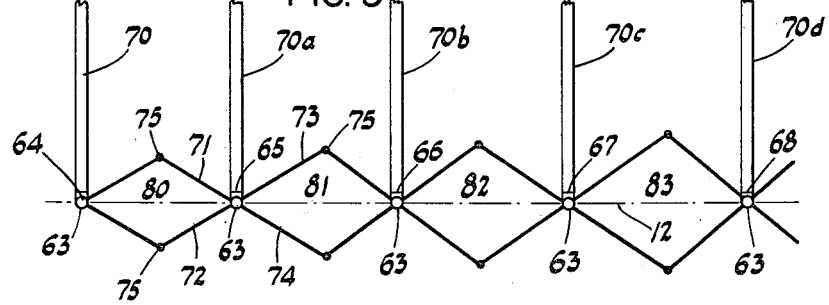
FIG. 10
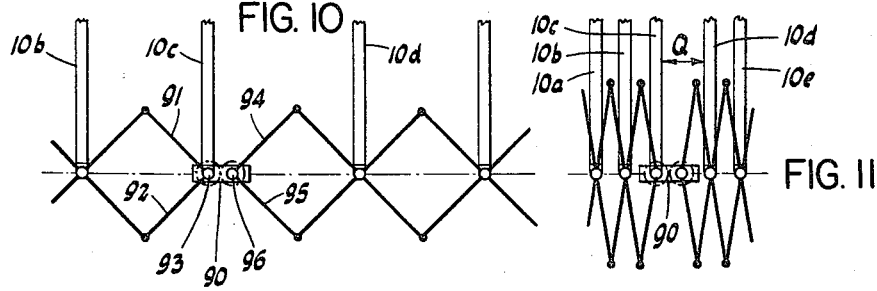
FIG. 11
FIG. 13   FIG. 12
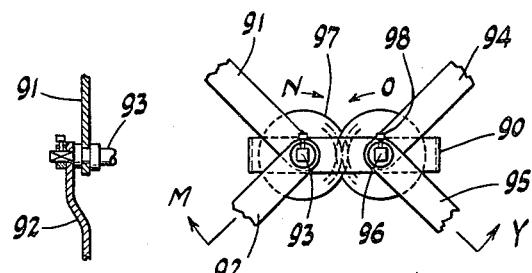
INVENTOR:
ANDRE HUET
BY 
ATTORNEY United States Patent Office 3,070,531
Patented Dec. 25, 1962

3,070,531
CONTROL APPARATUS FOR NUCLEAR REACTOR
André Huet, 48 Ave. du Président Wilson, Paris, France
Filed Jan. 29, 1958, Ser. No. 711,854
Claims priority, application France Feb. 14, 1957
7 Claims. (Cl. 204—193.2)

In nuclear reactors it is advantageous to provide means for accurately spacing apart or moving together the different fuel bars.

The present invention has for its object the provision of simple mechanical systems permitting one to obtain rapidly and with precision all possible variations of displacement of nuclear fuel bars with respect to each other.

In a first embodiment the arrangement consists essentially of a system of articulated quadrilaterals carrying between them the fuel bars of one row so that by exerting a pull or a thrust on the system, one may vary at will the spacing between the fuel bars of the said row. The distance which separates two adjacent fuel bars can remain, in each assumed position, the same for all the fuel bars of the row or may vary according to a formula fixed in advance. Each row of fuel bars is mounted on a support and the said supports are themselves regulated with respect to their relative spacing by means of a like system of articulated quadrilaterals arranged at 90° from the first.

In a variation of the system the articulated quadrilaterals are replaced by a system of threaded nuts and threaded screw bars or rods for moving them. The fuel rods mounted in such manner that they may slide in two perpendicular directions are fixed to nuts through which threaded control shafts run, of which the screw pitch varies from one nut to another in such manner that the displacement of successive nuts varies in proportion to its distance from a fixed point.

Another variation employs a system of telescopic screws. In a further embodiment the displacement of the fuel bars can be effected by levers of which the ratios of the sets of arms are increased to obtain increasing amplitudes of displacement for consecutive fuel rods.

On the other hand the control system for the fuel rods may consist of an arrangement providing at any desired point between the rows of fuel bars a space large enough, even in the extreme position when the bars are in closest proximity, to permit the sliding through this space a reflector panel isolating two parts of the reactor from each other.

Figure 6:
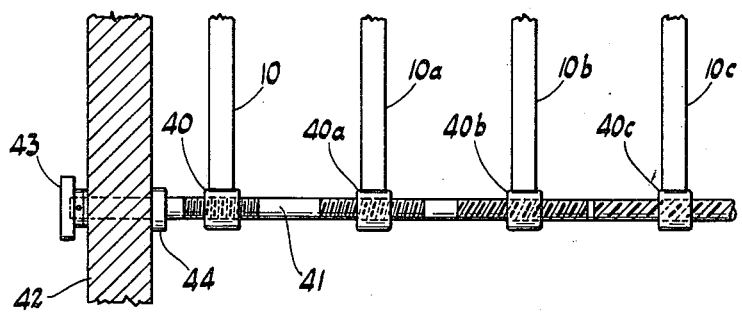

FIGURE 6 schematically represents an embodiment in which the regulation is effected by means of threaded nuts sliding on a control bar which has screw threads to advance the nuts.

Figure 7:
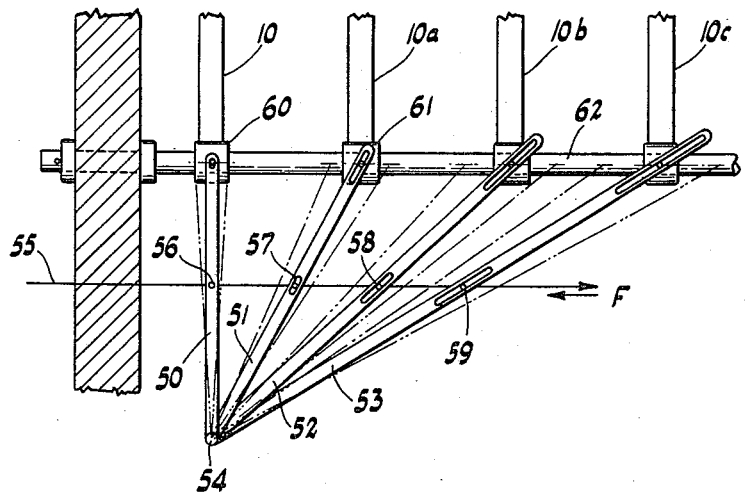

FIGURE 7 schematically represents an embodiment in which the regulation is effected by means of levers.

Figure 1:
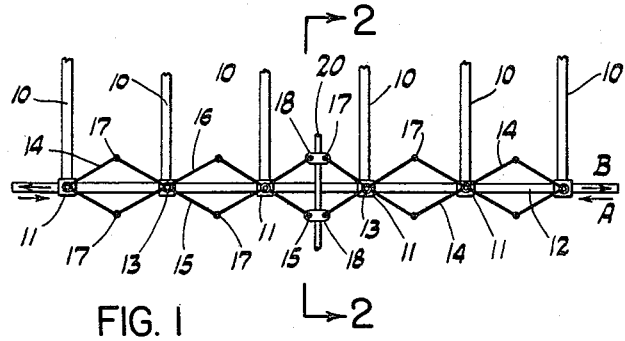
FIGURE 1 represents in elevation a row of fuel bars with a system of articulated quadrilaterals effecting their movements toward and away from each other.

FIGURE 8 shows schematically a system for displacing the rods by quadrilaterals as in FIGURE 1 in which the sides of the quadrilaterals are of different lengths.

FIGURE 9 shows the arrangement of FIGURE 8 with the fuel bars spread apart.

FIGURE 10 represents an embodiment with articulated quadrilaterals having equal sides with an arrangement permitting the maintenance of a minimum interval between two rows of fuel bars.

FIGURE 11 shows the arrangement of FIGURE 10 with the fuel bars moved together as closely as possible leaving a minimum interval between two rows of fuel bars.

FIGURES 12 and 13 show on a larger scale in front and side elevation the mechanism maintaining the spacing between two rows of fuel bars.

According to the present invention the nuclear fuel bars 10 in any one row within the reactor are each carried by individual mounts in the form of sleeves 11 sliding on a guide and support rod 12 common to the entire row of rods. On each of the sleeves 11 are pivoted the points 13 of a system of articulated rhombuses 14. This system of articulated rhombuses 13 resembles a lazy tongs or pantograph in that it is made up as shown in FIGURE 1 of traverse members 15, 16 whose midpoints are pivoted at 13 on a sleeve 11 while the two extremities of each of the two traverses 15, 16 are pivoted at the points 17 to the extremities of the traverses 15, 16 of the contiguous quadrilaterals. At a selected point of the rhombus system 14, for example at the middle, the extremities 17 of adjacent quadrilaterals are pivoted on sleeves 18 which may slide on a rod 20 which is secured to the support rod 12 and may constitute a fixed and stationary reference point in the system.

In these conditions if a pull or a thrust is exerted in the directions of the arrows A or B respectively, at any point whatsoever of the articulated system 14 as, for example, at one of its extremities, this produces a sliding of the sleeves 11 on the rod 12 in such manner that the nuclear fuel bars 10 will be more or less separated, or drawn together; the distance between any two fuel bars 10, however, remains in each position the same for all the fuel bars of the row.

Figure 3:
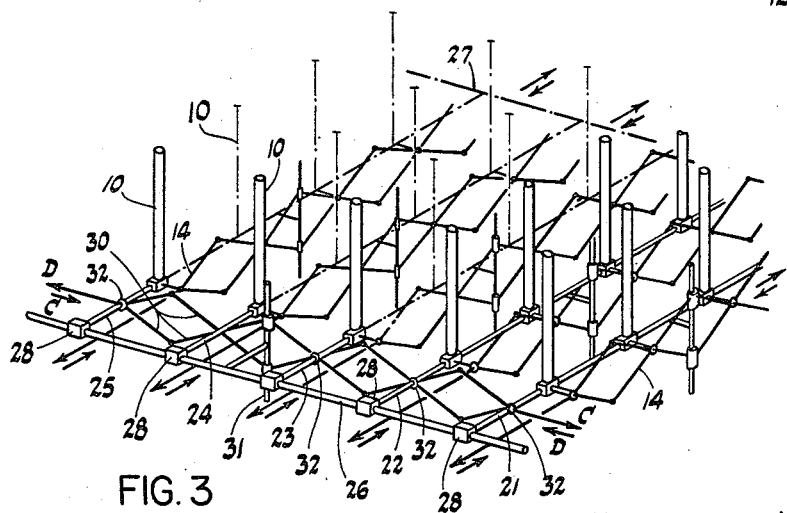
FIGURE 3 represents in perspective several parallel rows of fuel bars in the reactor with an articulated arrangement providing for the movement of the rows relative to each other.

The reactor consists of numerous rows of nuclear fuel bars 10 and there are shown in FIGURE 3 several parallel rows wherein the nuclear rods are each mounted in such manner as to be able to slide on support bars 21, 22, 23, 24, 25 individual to each row in the manner which has just been described. At the sides of the array of rods 10 the ends of the support bars 21–25 themselves slide by means of sleeves 28 on two stationary bars 26 and 27 common to the support bars 21, 22, 23, 24, 25 for the rows of rods. In a plane transverse to the system of bars 21–25 there is provided an articulated quadrilateral system 30 similar to the system 14 which has been described for each individual row of nuclear fuel rods. A selected point of the system 30 is rendered fixed by the employment of a bar 31 secured to the bar 26 while the points 32 of intersection of the traverse rods in the quadrilaterals constituting the articulated system 30 are mounted to pivot on the sleeves 28. Consequently, when one displaces, or exercises a pull or a thrust on, an extremity of the system 30 in the direction of the rows C or D this results in moving together or separation of the bars 21–25 which is to say that the spacing of the rows of nuclear fuel bars 10 is changed.

Figure 4:
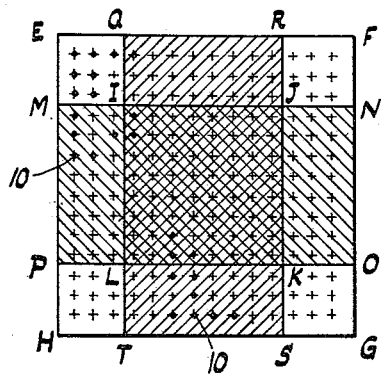
FIGURES 4 and 5 are schematic diagrams representing in plan view a number of different positions that it is possible to give to the fuel bars of the reactor.

It is clear that with the arrangement which has just been set forth, it is possible to realize many variations of the displacements of the nuclear fuel bars 10 with respect to each other within the reactor. If, for example, the array of nuclear fuel bars 10 are initially disposed as diagrammatically indicated in FIGURE 4, to lie within a large square E, F, G, H, then by the independent play of the articulated systems 14 and 30, one may move the fuel bars 10 to reassemble them in a smaller square similar to the first but with reduced sides, for example, into a minimum square I, J, K, L. It is equally possible to obtain rectangular displacements intermediate these two extreme positions by varying in a different fashion the interval between the rows 21–25 on the one hand and the spacing between the nuclear fuel bars 10 of an individual row on the other hand. One may, for example, obtain displacements where the nuclear bars are reassembled in the rectangle M, N, O, P or again in a rectangle Q, R, S, T, or in intermediate arrangements.

Figure 5:
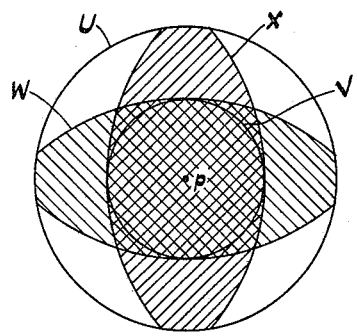

If the original displacements of the nuclear fuel bars are such that they are found to be located within a circle U having a center P (FIGURE 5) one can in like fashion reassemble all the nuclear bars within concentric circles having smaller radii and attain, for example, a minimum circle V. Again, by varying in different fashion the operation of the different rhombus systems 14 and that of the system 30 one may obtain the reassembly of the nuclear fuel bars within an ellipse or an oval such as W or yet within an ellipse or oval X whose major axis is directed at 90° with respect to the ellipse W; here again numerous intermediate displacements may be realized.

One can conceive two articulated systems such as 30 acting on the tips of the support bars 21–25 to modify their spacing with the displacements of these two articulated systems being co-ordinated.

As seen in FIGURE 6 the nuclear fuel bars 10 in another embodiment are each carried by a support 40 in the form of a nut that traverses a control bar 41 which is in the form of a threaded rod. The fixed point of the system corresponding to that of FIGURE 1 is constituted by a panel 42, a collar 44 fixed to bar 41 holding it against axial movement when its rotation, as schematically indicated, is effected by a knob 43. Over the paths of traverse for successive nuts 40a, 40b, 40c, 40d, etc. the rod 41 is threaded with progressively increasing pitch. That is to say, that the pitch for the nut 40a is double that for the nut 40, the pitch for the nut 40b is triple that which is provided for the nut 40, and so forth. Consequently, by rotating the rod 41, the first nuclear fuel bar 10 is displaced a certain distance, the following 10a by double this distance, the third 10b by triple the distance, and so forth. The distances between the nuclear fuel bars may thus be increased or decreased while the intervals between the fuel bars remain equal. The same arrangement can naturally be employed to obtain in a direction at right angles the displacement of the rows of nuclear fuel bars with respect to each other. As a variation one could employ a system of threaded telescopic rods sliding on one another and of which each forms a nut on its predecessor.

In another variation schematically shown in FIGURE 7 the displacement of the nuclear fuel bars 10 is brought about by means of levers 50, 51, 52, 53, which are pivoted at a fixed point 54 and regulated by a control bar 55 which may be moved in the direction of its axis as indicated by the arrow F. The control bar 55 carries equidistant lugs 56, 57, 58, 59, engaging in slots formed in the levers 50–53 and other slots in the levers engage pins on the sleeves 60, 61 which carry the rods 10. With this arrangement the displacement of the control rod 55 causes the sliding of the support sleeves 60, 61 on the guide rod 62, the distances between successive fuel bars remaining equal whatever may be the value of the distance between any two of the rods.

Figure 2:
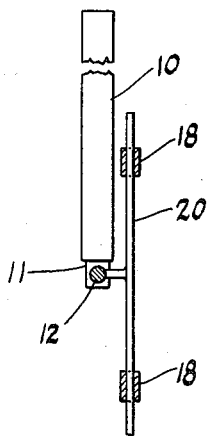
FIGURE 2 is a view of a detail as seen on line 2—2 of FIGURE 1.

A variation of the embodiment shown in FIGURES 1–3, the link bars that pivot at 63 on the support slides 64, 65, 66, 67, 68, etc. may, as shown in FIGURE 8, have unequal legs or branches. For the fuel bar 70a, for example, on whose sleeve 65 two traverse bars are pivoted at 63 the arms 71 and 72 of these rods are shorter than the arms 73 and 74. The bar extremities or ends of the arms 71 and 74 on the one hand and 72 and 73 on the other hand are as in FIGURE 1 pivotally connected at 75 to the traverse bars provided for adjacent nuclear bars. Likewise, with the nuclear bar 70b, the arms 76 and 77 of the traverse bars are shorter than the arms 78 and 79, and so forth. Consequently, supposing that the nuclear bar 70 represents the fixed point of the system, when one operates the articulated system to open or close it in departing from the position of FIGURE 8 where the intervals between the nuclear bars 70a, 70b, etc. are the same one sees that if the articulated system is extended as shown in FIGURE 9 the spacings between the nuclear bars increase, these spacings being respectively designated in FIGURE 9 by the numerals 80, 81, 82, 83. Instead of remaining identical among themselves the intervals increase in proportion to their displacement from the fixed point represented by the nuclear rod 70.

By choosing a suitable ratio or relation for the arms such as 71, 74 of each articulated traverse rod, it is possible to vary according to any desired formula the intervals between the fuel bars of the row.

In case where the adjustments of the nuclear bars 70a–70d are obtained by means of a threaded control bar on which nuts slide a suitable choice of successive thread pitches provided on the control bar enables realization of desired successive intervals separating two nuclear bars.

It is apparent that the same arrangements can be employed for regulating in a perpendicular direction the displacement of the various rows of nuclear bars with respect to each other.

It may be advantageous to arrange between two rows of nuclear bars a space such that in the position of closest proximity of the nuclear bars one can move into this space a reflecting panel which divides the reactor into two parts. To construct an apparatus permitting this in a system of articulated quadrilaterals having equal sides as represented in FIGURES 1–3 there is provided a spacer 90 arranged intermediate and forming the link between two adjacent articulated quadrilaterals as shown in FIGURE 10. This spacing device 90 is carried by one of the fuel bars, 10c for example, and the sides 91, 92 of the quadrilateral articulated on the nuclear fuel bar 10c instead of being extended beyond the point of articulation 93 terminate at this point and hence do not continue to form sides of a contiguous quadrilateral. The articulation for the sides 94 and 95 of the contiguous quadrilateral is at a point 96 on the spacer 90 at a distance from the articulation point 93. In order that the angle changes in the positions of the sides 91 and 92 of the antecedent quadrilateral shall be transmitted there beyond to the following quadrilateral beyond the spacing device 90, it is necessary to have an angular interconnection as between the sides 92 and 95 for example. For this purpose the arm 92 carries a pinion 97 (FIG. 12) fixed to it and meshing with a pinion 98 fixed to the arm 95. Consequently, when the arm 92 is displaced in the direction of the arrow M the pinion 97 turns in the direction of the arrow N and turns the pinion 98 in the direction of the arrow O which in this manner causes the displacement of the arm 95 in the direction of the arrow P, thus assuring the transmission of the articulating movement beyond the spacing member 90.

In the extreme contracted position of the articulated quadrilaterals which form the motion transmitting device where the nuclear bars 10a, 10b, 10c, etc. are in their positions of closest proximity, as shown in FIGURE 11, there exists between the rows in which the fuel bars 10c and 10d are located a space Q into or through which it is possible to move a reflector panel.

All the systems herein described for adjusting the nuclear fuel bars whether it is a system embodying articulated rods forming quadrilaterals or a system of levers, or a system of threaded nuts and operating screws, are preferably executed in invar alloy which assures accurate operation due to the fact that it is not liable to expansion, or contraction and since it is rust-proof.

The ease with which the array of nuclear fuel bars can be rearranged at various spacings by means of the constructions illustratively described above makes it possible to eventually eliminate cumbersome control rod or moderating rod mechanisms as heretofore provided in nuclear reactors. In operation, by spreading the nuclear bars at great enough spacings one assures the slowing down or stopping of the functioning of the nuclear reaction process. This results in a simplification of the construction and a diminishing of the volume of a reactor; furthermore, the control of the operation of the pile is assured in a more homogeneous manner by displacement of the nuclear fuel bars than occurs by the unilateral introduction to a greater or less extent of control rods through an end closure of a reactor.

What I claim is:

1. In a nuclear reactor having an array of elongated nuclear fuel bars disposed in spaced relationship in a plurality of parallel rows, a first mechanical linkage means interconnecting the bars in each row and operable in a first direction for simultaneously changing the positions of the bars with respect to each other in each row, said first mechanical linkage means including a supporting rod for each row upon which the fuel bars of each row are mounted for longitudinal movement thereover, and said linkage including means for displacing all the fuel bars simultaneously in the longitudinal direction of said supporting rods, and a second mechanical linkage means operative simultaneously but in a direction substantially at right angles to said first direction to vary the spaced relationship of the supporting rods for the rows of fuel bars with respect to each other, said second mechanical linkage means interconnecting said supporting rods with one another for simultaneously moving all of said supporting rods selectively toward and away from each other, whereby the operation of both mechanical linkage means moves the rows of fuel bars relatively to each other and also moves the fuel bars relatively to each other in their respective rows to vary the area occupied by said array of fuel bars.

2. In a nuclear reactor having an array of elongated nuclear fuel bars disposed in spaced relationship in a plurality of parallel rows, a first mechanical linkage means interconnecting the bars in each row and operable for simultaneously changing the positions of the bars with respect to each other in each row, said first mechanical linkage means including a supporting rod for each row upon which the fuel bars of each row are mounted for longitudinal movement thereover, and said linkage including means for displacing all the fuel bars simultaneously in the longitudinal direction of said supporting rods, and a second mechanical linkage means operative simultaneously to vary the spaced relationship of the supporting rods for the rows of fuel bars with respect to each other, said second mechanical linkage means interconnecting said supporting rods with one another for simultaneously moving all of said supporting rods selectively toward and away from each other, whereby the operation of both mechanical linkage means moves the rows of fuel bars relatively to each other and also moves the fuel bars relatively to each other in their respective rows to vary the area occupied by said array of fuel bars, the first mechanical linkage means for varying the relative positions of the fuel bars in the rows and the second mechanical linkage means for varying the spacing of the supporting rods, and thus the spacing of the rows of fuel bars in the reactor, including support means for the supporting rods and support means for the fuel bars, first means providing articulated quadrilaterals having sides pivoted on the support means for the fuel bars and second means providing articulated quadrilaterals having sides pivoted on the support means for the supporting rods, said first means and said second means being articulated at fixed points in the linkages whereby movement in either direction exerted on any point of the first means of the first linkage modifies the spacing between the fuel bars in a row and movement in either direction exerted on any point of the second means of the second linkage modifies the spacing between the rows of fuel bars.

3. A construction as defined in claim 2, wherein the length of the sides of the articulated quadrilaterals are different and provide variable spacing between adjacent fuel bars in each row.

4. A construction as defined in claim 2, wherein a spacing piece carrying two separated points of articulation for the sides of adjacent quadrilaterals is mounted at a point of articulation of said second linkage means, and pinions secured to the articulated sides of the quadrilaterals on the spacing piece and meshing together to transmit the movements of the articulated quadrilaterals across a minimum space provided by the spacing piece between two adjacent rows of fuel bars.

5. In a nuclear reactor having an array of elongated nuclear fuel bars disposed in spaced relationship in a plurality of parallel rows, a first mechanical linkage means interconnecting the bars in each row and operable in a first direction for simultaneously changing the positions of the bars with respect to each other in each row, said first mechanical linkage means including a supporting rod for each row upon which the fuel bars of each row are mounted for longitudinal movement thereover, and said linkage including means for displacing all the fuel bars simultaneously in the longitudinal direction of said supporting rods, and a second mechanical linkage means operative simultaneously but in a direction substantially at right angles to said first direction to vary the spaced relationship of the supporting rods for the rows of fuel bars with respect to each other, said second mechanical linkage means interconnecting said supporting rods with one another for simultaneously moving all of said supporting rods selectively toward and away from each other, whereby the operation of both mechanical linkage means moves the rows of fuel bars relatively to each other and also moves the fuel bars relatively to each other in their respective rows to vary the area occupied by said array of fuel bars, the nuclear fuel bars of each row being carried by individual mounts comprising nuts and said supporting rods being rotatable and including a plurality of threaded portions threadedly engaged by said nuts, the pitch of the threads of the threaded portions of the rods varying from each fuel bar mount to the adjacent fuel bar mount whereby rotation of the rods effects a displacement of the mounts and fuel bars a predetermined extent.

6. In a nuclear reactor having an array of elongated nuclear fuel bars disposed in spaced relationship in a plurality of parallel rows, a first mechanical linkage means interconnecting the bars in each row and operable for simultaneously changing the positions of the bars with respect to each other in each row, said first mechanical linkage means including a supporting rod for each row upon which the fuel bars of each row are mounted for longitudinal movement thereover, and said linkage including means for displacing all the fuel bars simultaneously in the longitudinal direction of said supporting rods, and a second mechanical linkage means operative simultaneously to vary the spaced relationship of the supporting rods for the rows of fuel bars with respect to each other, said second mechanical linkage means interconnecting said supporting rods with one another for simultaneously moving all of said supporting rods selectively toward and away from each other, whereby the operation of both mechanical linkage means moves the rows of fuel bars relatively to each other and also moves the fuel bars relatively to each other in their respective rows to vary the area occupied by said array of fuel bars, the first mechanical linkage means for varying the spacing of the fuel bars comprising mounts for said bars, pivoted levers connected to said mounts to displace them longitudinally on said supporting rods, and a common operating means effective to actuate said levers simultaneously.

7. In a nuclear reactor having an array of elongated nuclear fuel bars disposed in spaced relationship in a plurality of parallel rows, a first mechanical linkage means interconnecting the bars in each row and operable in a first direction for simultaneously changing the positions of the bars with respect to each other in each row, said first mechanical linkage means including an individual mounting means for each bar, a supporting rod for each row upon which the individual mounting means for the fuel bars of each row are mounted for longitudinal movement thereover, and said linkage including means for displacing all the mountings for the fuel bars in each row simultaneously in the longitudinal direction of said supporting rods, support means common to all of said rows of bars along which said rods may move relatively to each other, and a second mechanical linkage means operative simultaneously but in a direction substantially at right angles to said first direction to vary the spaced relationship of the supporting rods for the rows of fuel bars with respect to each other, said second mechanical linkage means interconnecting said support means with one another for simultaneously moving all of said supporting rods selectively toward and away from each other, whereby the operation of both mechanical linkage means moves the rows of fuel bars relatively to each other and also moves the fuel bars relatively to each other in their respective rows to vary the area occupied by said array of fuel bars.

References Cited in the file of this patent

UNITED STATES PATENTS

| | | |
|---|---|---|
| 425,168 | Gale | Apr. 8, 1890 |
| 515,051 | Krah | Feb. 20, 1894 |
| 1,346,646 | Gallagher | July 13, 1920 |
| 2,714,577 | Fermi et al. | Aug. 2, 1955 |
| 2,898,281 | Untermyer et al. | Aug. 4, 1959 |
| 2,900,316 | Kaufman et al. | Aug. 18, 1959 |
| 2,905,612 | Borst | Sept. 22, 1959 |

FOREIGN PATENTS

| | | |
|---|---|---|
| 132,646 | Australia | May 17, 1949 |